United States Patent [19]

Cooper

[11] Patent Number: 4,755,757
[45] Date of Patent: Jul. 5, 1988

[54] FLUID LEAK DETECTION SYSTEM FOR DETERMINING THE FATE OF FLUID LEAKAGE THROUGH A GEOMEMBRANE

[75] Inventor: John W. Cooper, San Antonio, Tex.

[73] Assignee: Southwest Research Institute, San Antonio, Tex.

[21] Appl. No.: 22,394

[22] Filed: Mar. 6, 1987

[51] Int. Cl.[4] .................... G01R 31/08; G01M 3/16
[52] U.S. Cl. ......................................... 324/557; 73/40
[58] Field of Search ................... 73/40, 861.12, 198; 324/559, 558, 557, 515, 529, 530; 340/605

[56] References Cited

U.S. PATENT DOCUMENTS

| | | | |
|---|---|---|---|
| 3,526,831 | 9/1970 | Smith | 324/559 |
| 3,800,217 | 3/1974 | Lowrance | 324/557 |
| 4,101,827 | 7/1978 | Offner | 324/559 X |
| 4,543,525 | 9/1985 | Boryta et al. | 324/559 |
| 4,719,407 | 1/1988 | Converse et al. | 340/605 X |
| 4,720,669 | 1/1988 | Owen | 340/605 X |
| 4,725,785 | 2/1988 | Converse et al. | 324/559 |

Primary Examiner—Michael J. Tokar
Assistant Examiner—Joseph W. Roskos
Attorney, Agent, or Firm—Gunn, Lee & Jackson

[57] ABSTRACT

A system and a method for measuring the leakage flow rate from an impounded liquid through a tear or hole in a geomembrane liner is set forth. It utilizes a narrowed passage connected with an inverted funnel to confine the flow, and further includes forming a transverse magnetic field thereacross, a sensor mutually perpendicular to the passage and the magnetic field and a voltmeter connected to the sensor for measuring the voltage. The voltage is dependent on the rate of flow of the leaked liquid along the passage.

16 Claims, 1 Drawing Sheet

FLUID LEAK DETECTION SYSTEM FOR DETERMINING THE FATE OF FLUID LEAKAGE THROUGH A GEOMEMBRANE

FIELD OF THE INVENTION

The field of this invention is measuring the amplitude or flow rate of a leak through a geomembrane. In particular, the apparatus measures leakage rate through a geomembrane defining a liquid impoundment. The apparatus utilized a confined housing around the leak, a magnet forming a field across the leakage flow and a perpendicular voltage measuring system.

BACKGROUND OF THE DISCLOSURE

This disclosure is directed to an apparatus or system which measures the rate of flow of leakage through a tear or perforation in the geomembrane. Liquid impoundments are made by scooping out a pond or lake, typically using earth moving equipment, and a geomembrane is spread across the pond. It is normally formed by joining multiple sheets of a thin plastic material. The material is perhaps a few mils thick. The sheet material is spread over the pond to define the bottom of the impoundment and marginal embankments which confine the liquid in the pond or impoundment. The soil beneath the geomembrane is prepared at least in some measure. For instance, sufficient quantities of clay may be available to form an almost impervious substrata which prevents leakage. In that event, even should a tear or perforation be made in the geomembrane, the leakage rate may be negligible. On the other hand, the subsoil beneath the geomembrane may be sandy and therefore a leak may have a substantial flow rate. Thus, the existence of a tear or perforation in the geomembrane is not necessarily related to the flow rate through the tear or perforation. In other words, the volumetric flow of liquid through the leak is variable and is dependent on many factors including the size of the leak, the nature of the soil beneath the geomembrane, saturation of the leaked liquid into the subsoil, and other factors.

Protection of the impounded liquid is very important. To this end, various and sundry devices have been devised for location of leaks. It is one thing to locate a leak, but it is another and separate factor to measure the volume of leakage fluid. The volume must be measured to determine whether or not the leak is a critical matter. The volume of flow cannot directly be inferred from the size of the tear or perforation. Accordingly, it must be measured independently of the size of the tear or perforation. This disclosure sets forth a flow measuring system.

The present invention is particularly useful in measuring the volume or flow rate in a leak through geomembrane. It is particularly successful with a geomembrane confining an impoundment of an electrically conductive liquid. The apparatus utilizes a type of inverted funnel. The wide end of the funnel includes a surround peripheral lip constructed with a lower edge having a weighted member therearound. This lower edge can be made pliant so that it conforms with the geomembrane contours. It is preferably somewhat wide, typically circular to enable it to encompass the area of the leak and adjacent regions. This seals off the region of the leak so that the leakage must then pass through the inverted funnel. The inverted construction terminates at an upper narrow inlet tube or passage. This functions as a venturi in that the flow rate of the liquid is accelerated through this narrow passage. On the exterior, there is arranged a magnetic system, ideally an electromagnet which forms a transverse magnetic field. The field is relatively long in that it preferably is formed at long magnetic poles to encompass the full length of the venturi system. A perpendicular pair of plates are positioned for measurement of voltage across the venturi within the magnetic field. This provides a voltage which is related to flow velocity as will be described in detail.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawing.

It is to be noted, however, that the appended drawing illustrates only typical embodiments of this invention and are therefore not to be considered limiting of its scope, for the invention may admit to other equally effective embodiments.

Figure 1:
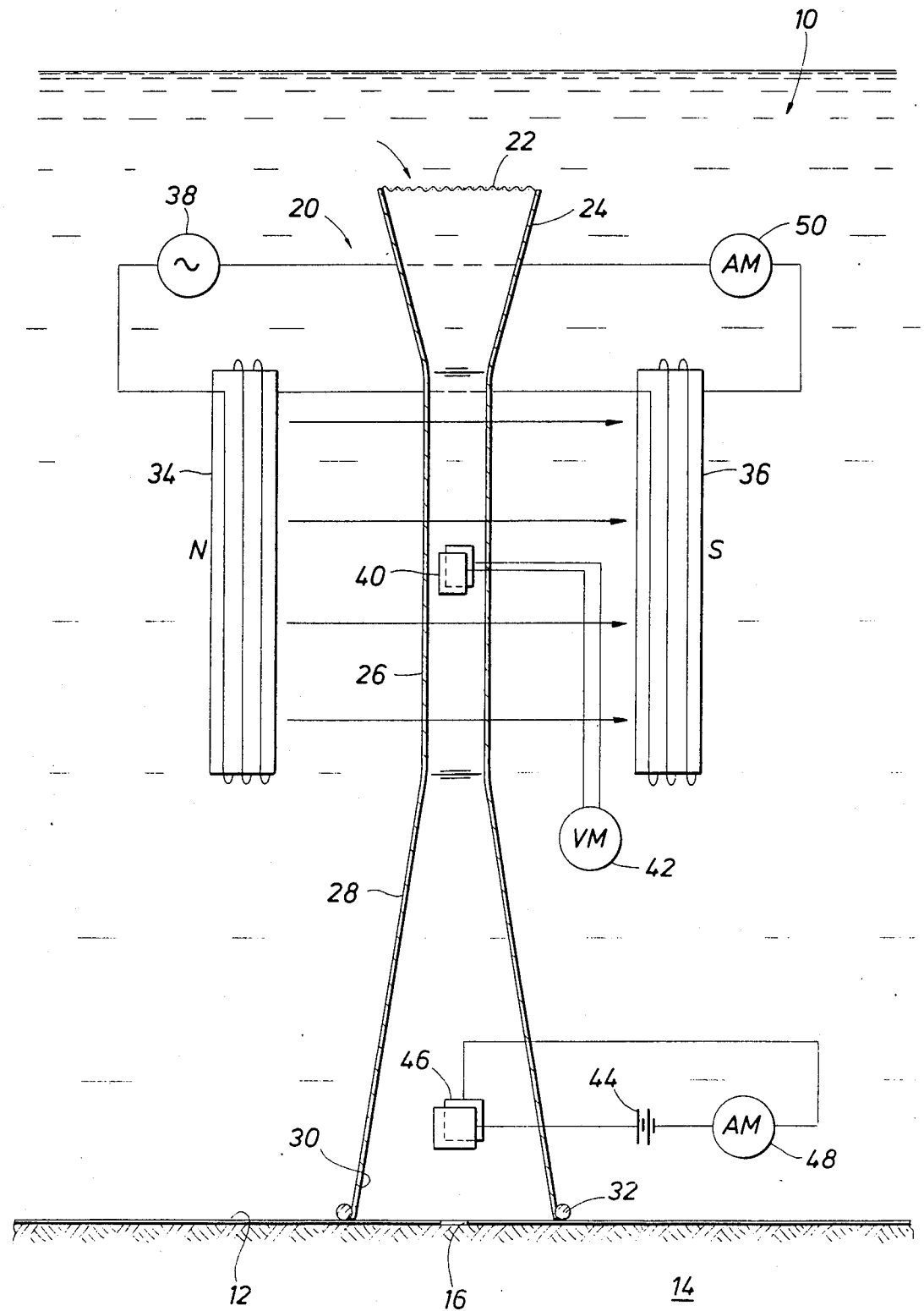

The single view is a sectional view through the leakage flow rate measuring system of the present disclosure showing the apparatus positioned above a tear in a geomembrane to measure the rate of leakage of the impounded liquid through the tear.

DESCRIPTION OF THE PREFERRED EMBODIMENT

Attention is directed to the only view in the drawings where a liquid impoundment is generally indicated by the numeral 10. It is defined by a geomembrane 12 which is supported above and/or on a clay strata 14. The numeral 16 identifies a tear or perforation in the geomembrane. Leakage from the impoundment 10 through the perforation 16 into the strata must be measured. The tear or perforation 16 can be regular or irregular. The size or shape of the perforation can vary widely. It is important that the present apparatus, however, fully encircle the tear 16 so that the total volumetric flow can be measured. The liquid which passes through the tear enters the strata 14. Dispersion of the liquid in the strata 14 depends in large part on the soil composition.

The present apparatus is identified generally by the numeral 20. It includes a porous screen 22 at the top end which admits the leakage material to be measured. That is, it is intended that the sole entrance for the measured liquid is through the screen 22 removes out trash. This assumes accuracy in measurement. The upper end of the apparatus is thus an enlarged flared entrance funnel 24. That connects in turn to a narrow passage 26. It is relatively narrow so that the leakage liquid entering the measuring apparatus must flow at an increased velocity. The passage 26 terminates at an inverted funnel 28. The funnel 28 is enlarged and terminates at a lower end having a diameter sufficient to enclose the tear 16. It is possible for the tear to be so large that the apparatus will not encompass it. However, the funnel is made sufficiently large, or is made in two or three different sizes to insure that the leak 16 can be enclosed within the lower end of the funnel 28.

The apparatus as described can be made of plastic or other non-magnetic material. It is preferably rigid or substantially so. At the lower end, it terminates at a lip 30, the lip 30 supporting an encircling weight 32. The weight 32 assists in contacting the funnel against the geomembrane. The geomembrane 12 is normally made of sheet material and may be perfectly planar or it may be undulating depending on the contours of the support soil 14 therebelow. The lower end of the funnel at 30 is preferably slightly compliant. This enables the funnel to conform to the undulations in the geomembrane. Moreover, the two are brought together so that the weight 32 presses the funnel snugly against the geomembrane and assures that the funnel protects against leakage underneath the edge. Therefore, all the liquid which passes through the tear 16 must pass through the upper end of the funnel and in particular through the narrow passage 26.

In cross-section, the passage 26 can either be circular or rectangular. The transition into the upper end of the funnel 28 is relatively smooth so that the flow through the passage 26 is substantially without turbulence. There is a venturi formed by the narrowing at the passage 26. This accelerates the velocity of the liquid. In other words, as the cross-section area of passage 26 below the cross-section area of the leak, is reduced, the velocity is increased to correspond with the leaked liquid flow. All leakage thus passes through the narrow passage 26 and is available for measurement as will be described.

On the exterior of the passage 26, an electric induction coil system is defined by a left coil 34 and a right coil 36. These coils are provided with current flow from an oscillator 38. The oscillator is adjustable to some fequency which is typically in a low frequency range. The field intensity is in part determined by the scale factors including spacing of the coils, number of turns in the coils current flow, and the like. It is not essential that the intensity be high, but it is desirable that the magnetic field be uniform along a substantial length of the passage 26. More will be noted concerning this hereinafter.

The magnetic field is at right angles to the direction of flow through the passge 26. A mutually perpendicular axis is thus defined for locating a pair of spaced voltage measurement electrodes 40. It will be understood that two electrodes are spaced on opposite sides of the passage 26. They are within the passage 26 to contact the liquid therein and; they are spaced from one another so that the bulk of the liquid flows between the two electrodes. If the passage is rectangular they can be conveniently attached to the inside faces of the retangular passage opposite one another. The two electrodes 40 are mutually perpendicular to the flow direction and the magnetic field. The plates 40 are connected to a volt meter 42 which provides an output voltage measurement.

In addition to the apparatus just described, the system also includes a battery 44 which is connected to a pair of spaced electrode plates 46. The plates 46 provide current flow through the liquid. The liquid imposes an electrical resistance between the two electrodes 46. The resistance of the liquid (using a fixed battery 44) may be learned from the current measured by ammeter 48.

Operation of this apparatus will now be described and a theory of operation will be stated. The fluid 10 is a flowing conducting liquid. It has a width L between the two plates 40. It moves at a velocity V. This occurs in the perpendicular magnetic field having an intensity represented by the symbol B. Both B and V are vectors having amplitude and direction and are positioned in the illustrated positions to enable the cross products to be obtained. This forms an induced voltage represented by E. In using these definitions, the magnitude of the voltage is given by:

$$E = (B \times V)L \tag{1}$$

Utilizing this relationship, the spacing L is fixed at the time of construction of the apparatus and is therefore an invariant factor. The magnetic filed intensity between the induction coils 34 and 36 is directly proportional to the current which is measured by the ammeter 50. This yields a factor which can be related to the magnetic field intensity B in equation (1). Once current is measured and fixed, the only variable on the right side of the equation is velocity V. Since voltage is the only term on the left side of equation (1) and it can be measured by the voltmeter 42, one can then conclude that velocity is proportional to the measured voltage. Appropriate scale factors enable the voltage measurement to be related to the velocity. The leakage rate can then be related to the measured voltage.

There is an alternate approach which does not require measurement of the magnetic field. Again, looking at equation (1) and assuming that the passage 26 is of regular cross-section, the velocity of the fluid passing through it is inversely proportional to the cross-sectional area of the passage 24. In turn, that is related to the cross-sectional dimension L. For a fixed electric current to the coils 34 and 36, the magnetic flux B is inversely proportional to the area within the coil. If the area of the coil is larger, the flux is inversely proportional to the increased area. For a fixed current, then the flux B increases inversely with the width of the passage 26. The measured voltage at the meter 42 is then related to the spacing dimension, namely, L-2. The potential across the throat as measured by the meter 42 is then considered in conjunction with the conductivity of the liquid. Recall that conductivity is given by the meter 48 which indicates variation in current flow as a function of liquid resistance.

Certain practical factors should be noted in the operation of this device. It is desirable to use a relatively low frequency current to form the magnetic field. This typically reduces noise interference. Moreover, an alternating field avoids drift errors at the voltmeter 42. It is generally desirable that the passage 26 be as relatively long as can be practical. It is also desirable that the magnetic field across the venturi throat be equally as long as possible.

In operation, the apparatus of the present disclosure is positioned over the hole 16 and pressed downward. It is contacted against the geomembrane 12 to prevent leakage around the edge. On review of equation (1) it should be noted that it is convenient to hold the magnetic field intensity constant. The construction of the device fixes the spacing L. Measurement of the voltage at the meter 42 indicates the velocity. This measurement can be easily calibrated in desired units. Velocity can then be related to total volume flow which is the time integral of the velocity times the cross-section area of passage 26. Periodically, it is desirable to measure the resistance of the liquid. Measurement of the liquid resistivity noted at the instrument 48 helps specify dilution or purity of the liquid in impoundment.

While the foregoing is directed to the preferred embodiment, the scope is determined by the claims which follow.

What is claimed is:

1. Leak flow rate measuring apparatus for determining the rate of flow of an impounded liquid through an opening in the geomembrane defining the impoundment, the apparatus comprising:
   (a) movable leak covering means having:
      (1) a lower peripheral edge adapted to be contacted against the geomembrane and sealed thereagainst to prevent leakage therebeneath;
      (2) a narrowed portion defining a passage wherein leaking liquid passes through said passage;
      (3) an inlet for introducing additional liquid iinto said passage;
   (b) means for forming an alternating transverse magnetic field across said passage;
   (c) a pair of spaced voltage measuring sensors for measuring voltage across said passage wherein the voltage is formed by the flowing conducting liquid passing through said magnetic field; and
   (d) output means connected to said sensor means for providing an output indicative of the voltage formed across said sensor means wherein the voltage is related to the rate of flow of liquid from the impoundment along said passage and through the opening in the geomembrane.

2. The apparatus of claim 1 wherein the magnetic field is formed by a pair of spaced inducting coils, said coils being driven by an alternating current power supply connected thereto.

3. The apparatus of claim 2 wherein said coils are on the exterior of said passage and have sufficient length to form a relatively uniform magnetic field along the length of said passage.

4. The apparatus of claim 3 including current measuring means serially connected to a current source for measuring the current applied to said coil means for determining current and thereby measuring flux for said magnet means.

5. The apparatus of claim 1 wherein said sensor means comprises a pair of spaced electrode plates in said passage and said passage is relatively narrow compared to said inlet to cause the impounded liquid to flow more rapidly along said passage.

6. The apparatus of claim 1 wherein said output means is a voltmeter connected to a pair of spaced plates comprising said sensor means.

7. Apparatus of claim 1 further including means for measuring the resistivity of the liquid in said leak cover means.

8. The apparatus of claim 1 wherein said leak covering means terminates at a lower peripheral lip having a weight therearound, and wherein said weight and said lip enable said leak covering means to comply to the shape of said geomembrane around the opening therein.

9. The apparatus of claim 8 wherein said lower peripheral lip is located at the lower edge of an inverted funnel shaped housing which connects with said passage.

10. The apparatus of claim 9 wherein said funnel shaped means tapers to said passage, and said passage is axially aligned therewith.

11. The apparatus of claim 10 including means for filtering trash from said inlet to prevent trash from flowing into said passage.

12. The apparatus of claim 11 including a flared open upper end on said passage.

13. A method of determining the flow rate of a leak from an impounded liquid through a hole in a geomembrane defining the liquid impoundment wherein the method comprises the steps of:
   (a) with a shaped housing means, limiting access of the impounded liquid to the leak to thereby direct the impounded liquid to the leak to flow along a defined passage means;
   (b) across said passage means, forming a perpendicular magnetic field;
   (c) across said passage means, and at right angles to the magnetic field, measuring a voltage induced in the flowing impounded liquid; and
   (d) relating the measured voltage to the rate of flow of impounded liquid through the hole in the geomembrane.

14. The method of claim 13 including the step of confining flow into the hole in the geomembrane by said housing means so that the only path of entry is along said passage means.

15. The method of claim 14 wherein the magnetic field is formed by applying an adjustable frequency, adjustable current flow to a pair of spaced coils to controllably define the magnetic field across said passage means at right angles thereto.

16. The method of claim 15 further including the step of measuring magnetic field intensity by measuring the current producing the magnetic field.

* * * * *

UNITED STATES PATENT AND TRADEMARK OFFICE
CERTIFICATE OF CORRECTION

PATENT NO. : 4,755,757
DATED : July 5, 1988
INVENTOR(S) : John W. Cooper

It is certified that error appears in the above—identified patent and that said Letters Patent is hereby corrected as shown below:

On the title page and column 1, title of invention should read

-- FLUID LEAK DETECTION SYSTEM FOR DETERMINING THE RATE OF FLUID --.
LEAKAGE THROUGH A GEOMEMBRANE

Signed and Sealed this

Fourteenth Day of February, 1989

Attest:

DONALD J. QUIGG

*Attesting Officer*     *Commissioner of Patents and Trademarks*